US012631583B2

(12) United States Patent
Ding et al.

(10) Patent No.: US 12,631,583 B2
(45) Date of Patent: May 19, 2026

(54) IGCC FUEL COMPONENT ANALYSIS AND CALORIFIC VALUE MEASUREMENT SYSTEM

(71) Applicant: Huaneng (Tianjin) Coal Gasification Power Generation Co., Ltd., Tianjin (CN)

(72) Inventors: Jianbo Ding, Tianjin (CN); Hang Guo, Tianjin (CN); Jian Wang, Tianjin (CN); Guangli Zhou, Tianjin (CN); Zhiqiang Li, Tianjin (CN); Xiangping Wang, Tianjin (CN); Haipeng Qi, Tianjin (CN); Yuntao Ai, Tianjin (CN); Jiye Tao, Tianjin (CN)

(73) Assignee: Huaneng (Tianjin) Coal Gasification Power Generation Co., Ltd., Tianjin (CN)

( * ) Notice: Subject to any disclaimer, the term of this patent is extended or adjusted under 35 U.S.C. 154(b) by 349 days.

(21) Appl. No.: 18/344,814

(22) Filed: Jun. 29, 2023

(65) Prior Publication Data

US 2024/0345009 A1 Oct. 17, 2024

Related U.S. Application Data

(63) Continuation of application No. PCT/CN2023/087790, filed on Apr. 12, 2023.

(30) Foreign Application Priority Data

Feb. 17, 2022 (CN) ........................ 202210146319.X

(51) Int. Cl.
$G01N\ 25/22$ (2006.01)
$G01N\ 1/22$ (2006.01)

(52) U.S. Cl.
CPC ........... $G01N\ 25/22$ (2013.01); $G01N\ 1/2202$ (2013.01)

(58) Field of Classification Search
None
See application file for complete search history.

(56) References Cited

U.S. PATENT DOCUMENTS

2010/0011664 A1* 1/2010 Ariyapadi ............. C10K 1/002
48/128
2010/0181539 A1* 7/2010 Apanel ................. C10K 1/002
252/373
(Continued)

FOREIGN PATENT DOCUMENTS

CN 104977394 A 10/2015
CN 105403683 A 3/2016
(Continued)

OTHER PUBLICATIONS

Sheng Yu and Xiangshun Li. 'Proportional-Integral-Derivative Controller Performance Assessment and Retuning Based on General Process Response Data' ACS Omega, 2021, 6, 10207-10223.
(Continued)

*Primary Examiner* — Erica S Lin

(57) ABSTRACT

An IGCC fuel component analysis and calorific value measurement system, the fuel components can be effectively measured by an infrared instrument and a chromatographic instrument; the multiplex redundant measurement is combined, two syngas is sampled by two sampling devices, two groups of measuring instruments are arranged, the multi-channel calculation of calorific value improves the reliability of calorific value control, and the measurement and process problems are effectively found by calorific value comparison, guaranteeing the effective output of calculated values in the fault state of the instrument, improving the calculation accuracy of calorific value, accurately analyzing the fuel components and calculating the fuel calorific value, and ensuring the stability of the calorific value regulation system and the stable operation of gas turbine; the multi-directional, diversified and multi-security instrument and the introduction of comparison between measured and calculated calo- (Continued)

Syngas sampling: Sample syngas in two ways, reduce the syngas pressure, and heat and regulate the syngas — S11

Syngas pretreatment: Dehydrate the wet syngas through the constant temperature condensing unit — S12

Syngas component measurement: A syngas component measuring device comprises a first measuring device and a second measuring device — S13

Calorific value calculation of syngas: The infrared instrument measures the fuel component values, introduces the measured and calculated calorific value formulas, and compare the two calorific values as the reference — S14

Perform PID mediation to control the regulating valve to regulate the total calorific value of the fuel — S15

The chromatographic instrument is used as a standby instrument, and the value of the chromatographic instrument can be selected to ensure complete loop control when the infrared instrument fails — S16 rific values can effectively monitor the change of calorific value and the equipment status.

4 Claims, 3 Drawing Sheets

(56)                    References Cited

U.S. PATENT DOCUMENTS

| | | | |
|---|---|---|---|
| 2011/0134430 A1 | 6/2011 | Kastner | |
| 2013/0327141 A1* | 12/2013 | Floyd, Jr. | G08B 21/16 |
| | | | 73/335.02 |
| 2014/0326049 A1 | 11/2014 | Zelepouga et al. | |
| 2016/0061114 A1* | 3/2016 | Guethe | F23N 5/242 |
| | | | 60/776 |
| 2021/0262996 A1 | 8/2021 | Kojima et al. | |

FOREIGN PATENT DOCUMENTS

| | | | |
|---|---|---|---|
| CN | 107271597 | A | 10/2017 |
| CN | 208060427 | U | 11/2018 |
| CN | 112648081 | A | 4/2021 |
| CN | 114200063 | A | 3/2022 |
| CN | 104597754 | A | 5/2025 |
| RU | 2011140504 | A | 4/2013 |

OTHER PUBLICATIONS

Song Chen, Jiaxu Liu, Pengkai Wang, Chao Xu, Shengze Cai, Jian Chu. 'Accelerated optimization in deep learning with a proportional-integral-derivative controller' Nature Communications, Nov. 26, 2024(Nov. 26, 2024),All.
C. Descampsa, C. Boualloua, M. Kannicheb. 'Efficiency of an Integrated Gasification Combined Cycle (IGCC) power plant including CO2 removal' Energy, 33 (2008) 874-881.

* cited by examiner

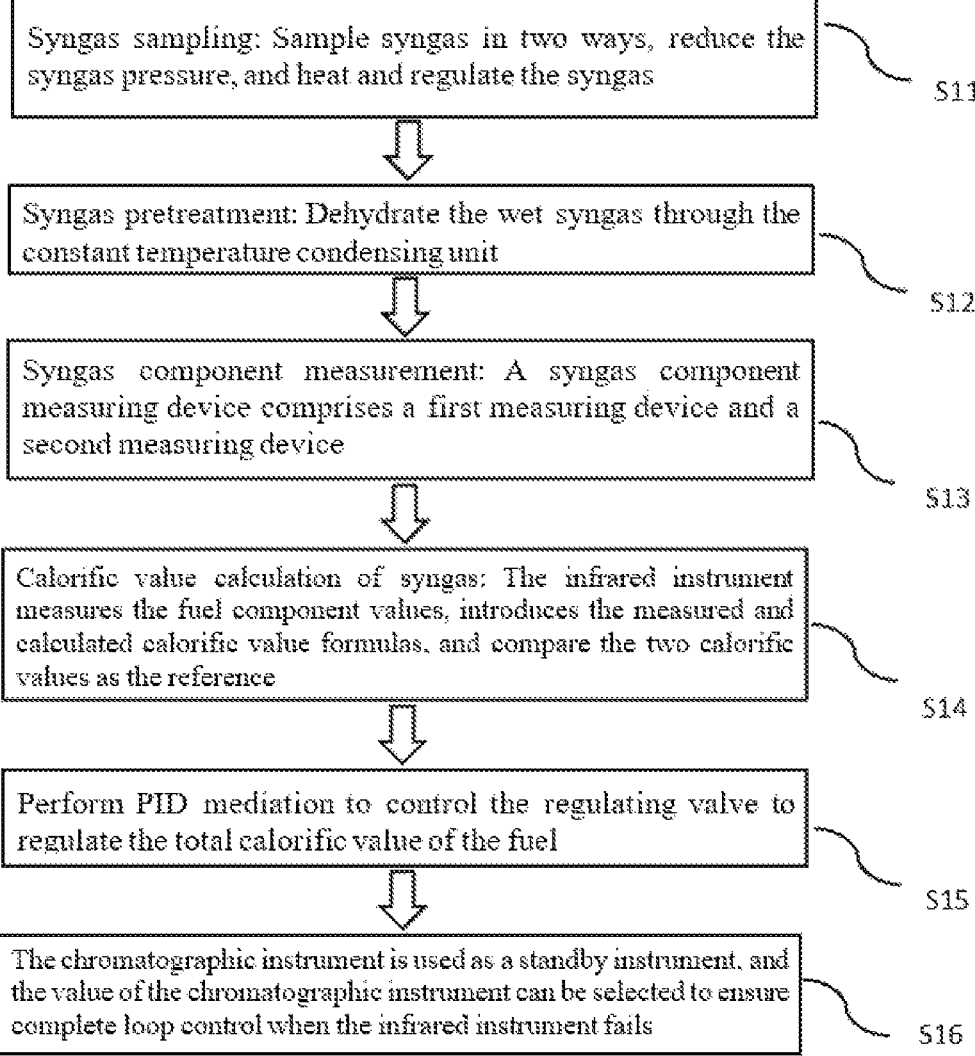

Syngas sampling: Sample syngas in two ways, reduce the syngas pressure, and heat and regulate the syngas ⟶ S11

Syngas pretreatment: Dehydrate the wet syngas through the constant temperature condensing unit ⟶ S12

Syngas component measurement: A syngas component measuring device comprises a first measuring device and a second measuring device ⟶ S13

Calorific value calculation of syngas: The infrared instrument measures the fuel component values, introduces the measured and calculated calorific value formulas, and compare the two calorific values as the reference ⟶ S14

Perform PID mediation to control the regulating valve to regulate the total calorific value of the fuel ⟶ S15

The chromatographic instrument is used as a standby instrument, and the value of the chromatographic instrument can be selected to ensure complete loop control when the infrared instrument fails ⟶ S16

FIG. 1

IGCC FUEL COMPONENT ANALYSIS AND CALORIFIC VALUE MEASUREMENT SYSTEM

CROSS-REFERENCE TO RELATED APPLICATIONS

This application is a continuation of PCT/CN2023/087790, filed Apr. 12, 2023 and claims priority of Chinese Patent Application No. 202210146319.X, filed on Feb. 17, 2022, the entire contents of which are incorporated herein by reference.

TECHNICAL FIELD

The invention relates to the technical field of IGCC coal chemical industry, in particular to an IGCC fuel component analysis and calorific value measurement system.

BACKGROUND ART

Compared with the traditional coal and gas modes, syngas is used as the fuel in the IGCC mode. However, the syngas has complex components, and the content ratio of different components will affect the change of calorific value. Therefore, fuel component measurement and calorific value calculation are of great significance for the stable operation of IGCC mode. The IGCC fuel components mainly include H2, CO, CO2, CH4, N2 and H2O. Although the calorific value is mainly produced from H2, CO and CH4, the content of N2 and H2O also has great influence on the calculation of fuel calorific value. In the process calorific value regulation, H2O is injected to regulate the calorific value. The content of H2O is calculated by the cooling dehydration difference method instead of the trace water analysis due to the large proportion of H2O content. The components of combustible gases H2, CO and CH4 can be measured by the chromatography and infrared method.

Generally, the traditional measurement method of combustible gas is chromatography. Although the combustible gases are analyzed accurately by chromatography, the analysis time is long, and the measured values are phased, which cannot quickly reflect the values of gas components. At the same time, the instrument sampling system has no redundancy and poor sampling reliability, the measured data after instrument failure may affect the stable operation of the unit, the calculated fuel calorific value is relatively simple without other references, the instrument failure is hard to find, and the calorific value monitoring is not perfect and reliable enough.

CONTENT OF INVENTION

In view of the defects or deficiencies in the prior art, the invention provides an IGCC fuel component analysis and caloric value measurement system, including the following steps:

Step 1: Syngas sampling: Sample syngas in two ways, reduce the syngas pressure, and heat and regulate the syngas;

Step 2: Syngas pretreatment: Dehydrate the wet syngas through the constant temperature condensing unit to remove water in the wet syngas, and calculate the water proportion by comparing the mass before and after condensation;

Step 3: Syngas component measurement: A syngas component measuring device comprises a first measuring device and a second measuring device, each measuring device is composed of a methane, carbon dioxide and carbon monoxide measuring instrument and a hydrogen measuring instrument;

Step 4: Calorific value calculation of syngas: The infrared instrument measures the fuel component values, introduces the measured and calculated calorific value formulas, and compare the two calorific values as the reference of system calorific values;

Step 5: Transmit the calculation results to a second calorific value analysis unit through a first calorific value analysis unit, and the second calorific value analysis unit performs PID mediation by comparing the preset calorific value with the received calorific value to control the regulating valve to regulate the total calorific value of the fuel;

Step 6: The chromatographic instrument is connected with the second calorific value analysis unit as a standby instrument, and the value of the chromatographic instrument can be selected to ensure complete loop control when the infrared instrument fails.

Preferably, a main pipe is connected with a carbon monoxide detector after syngas pretreatment, and an alarm is given when the concentration of carbon monoxide is higher than 200 ppm in the analysis instrument cabinet.

Preferably, standard methane, carbon dioxide, carbon monoxide, hydrogen cylinders and zero nitrogen cylinders are provided, and the instrument range and zero point can be calibrated.

Preferably, the measured and calculated calorific value formulas are used to analyze the equipment status and the fuel calorific value through two pairs of calorific values.

Compared with the prior art, the invention has the following beneficial effects: the fuel components can be effectively measured by taking an infrared instrument as the main instrument and a chromatographic instrument as a standby instrument; the multiplex redundant measurement is combined, two syngas is sampled by two sampling devices, two groups of measuring instruments are arranged, the multi-channel calculation of calorific value improves the reliability of calorific value control, and the measurement and process problems are effectively found by calorific value comparison, guaranteeing the effective output of calculated values in the fault state of the instrument, improving the calculation accuracy of calorific value, accurately analyzing the fuel components and calculating the fuel calorific value, and ensuring the stability of the calorific value regulation system and the stable operation of gas turbine; the multi-directional, diversified and multi-security instrument can effectively monitor the change of calorific value and the equipment status by comparison between measured and calculated calorific values.

It should be understood that the contents described in the Content of the Invention is not intended to define the key or important characteristics of embodiments of the invention or to limit the scope of the invention. Other characteristics of the invention will be readily understood by the following description.

DESCRIPTION OF DRAWINGS

Other characteristics, purposes, and advantages of the invention will become more apparent by reading a detailed description of non-restrictive embodiments with reference to the drawings below:

FIG. 1 is the flow diagram of the IGCC fuel component analysis and calorific value measurement system;

Figure 2:
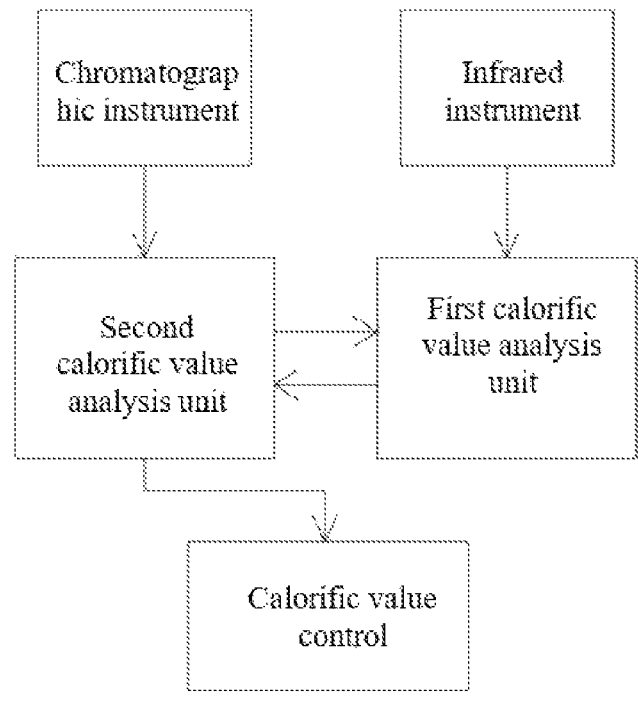
FIG. 2 is the structural diagram of the IGCC fuel component analysis and calorific value measurement system.
Figure 3:
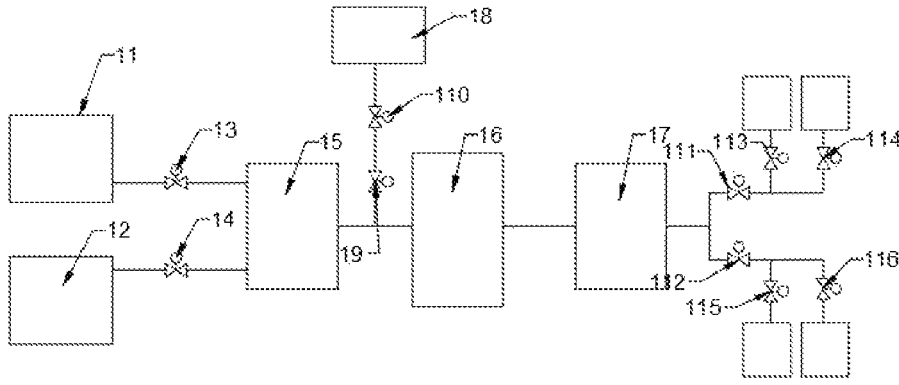
FIG. 3 is the internal structure diagram of the infrared instrument.
Figure 4:
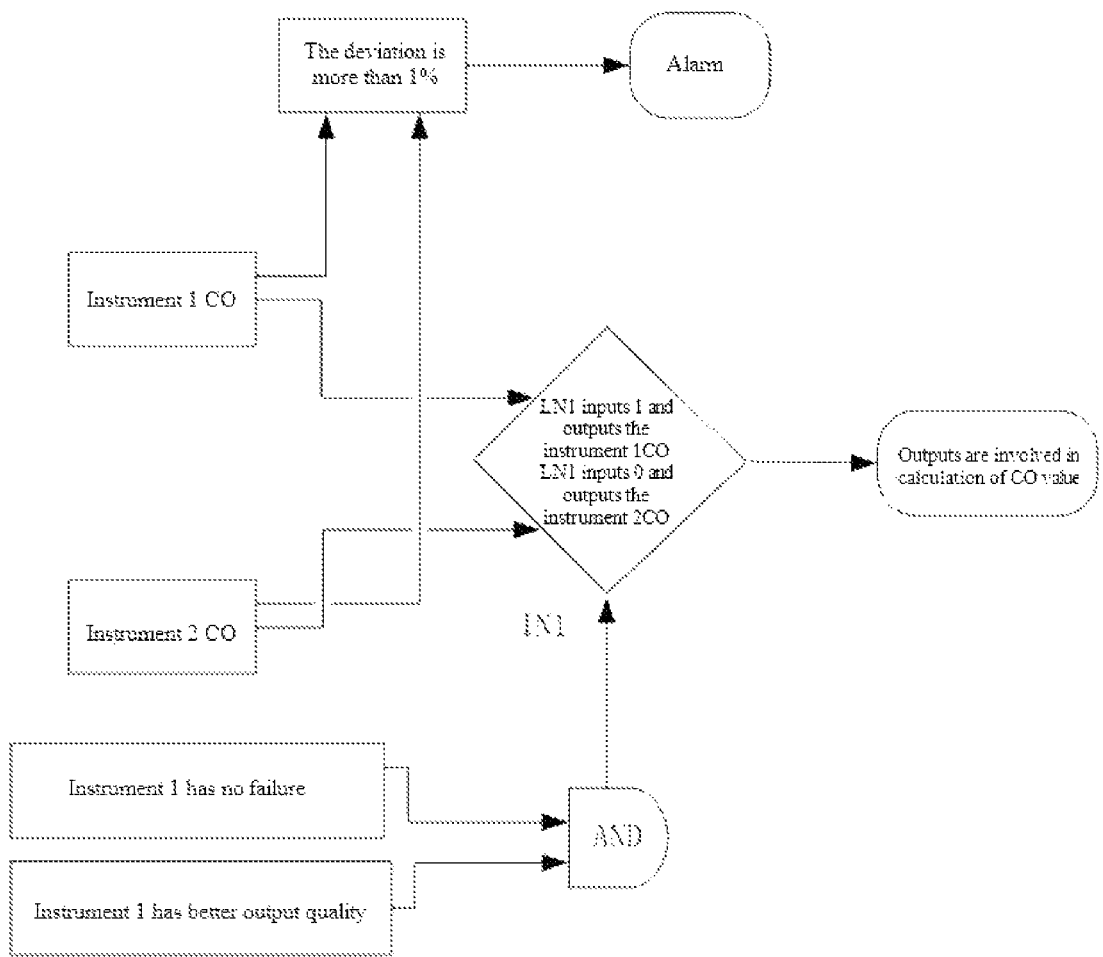
FIG. 4 is the reliable output logic diagram of the measuring group values in the instrument.

Numbers labelled in the figure: 11. First sampling device; 12. Second sampling device; 13. First pneumatic valve; 14. Second pneumatic valve; 15. First mass flowmeter; 16. Constant temperature condensing unit; 17. Second mass flowmeter; 18. Carbon monoxide detector; 19. First pressure regulating valve; 110. First flow regulating valve; 111. First solenoid valve; 112. Second solenoid valve; 113. Second flow regulating valve; 114. Third flow regulating valve; 115. Fourth flow regulating valve; 116. Fifth flow regulating valve.

EMBODIMENTS

The invention is further detailed below according to the drawings and the embodiments. It is understood that the embodiments described here serve only to explain the invention, but not to limit the invention. It should also be noted that only the parts related to the invention are shown in the drawings for the convenience of description.

It should be noted that the embodiments of the invention and the characteristics in the embodiments may be combined with each other. The invention is described below in detail according to the drawings and the embodiments.

Please refer to FIG. 1-2. The embodiments of the invention provide an IGCC fuel component analysis and calorific value measurement system, including the following steps:

Step 1: Syngas sampling: Sample syngas in two ways, reduce the syngas pressure, and heat and regulate the syngas;

Step 2: Syngas pretreatment: Dehydrate the wet syngas through the constant temperature condensing unit to remove water in the wet syngas, and calculate the water proportion by comparing the mass before and after condensation;

Step 3: Syngas component measurement: A syngas component measuring device comprises a first measuring device and a second measuring device, each measuring device is composed of a methane, carbon dioxide and carbon monoxide measuring instrument and a hydrogen measuring instrument;

Step 4: Calorific value calculation of syngas: The infrared instrument measures the fuel component values, introduces the measured and calculated calorific value formulas, and compare the two calorific values as the reference of system calorific values;

Step 5: Transmit the calculation results to a second calorific value analysis unit through a first calorific value analysis unit, and the second calorific value analysis unit performs PID mediation by comparing the preset calorific value with the received calorific value to control the regulating valve to regulate the total calorific value of the fuel;

Step 6: The chromatographic instrument is connected with the second calorific value analysis unit as a standby instrument, and the value of the chromatographic instrument can be selected to ensure complete loop control when the infrared instrument fails.

In this embodiment, the infrared instrument is provided with two sampling devices, including the first sampling device 11 and the second sampling device 12, the main functions of the sampling devices are to regulate the sampling pressure (generally controlled to 3 bars) and preliminarily filtrate the syngas to ensure that the sample gas does not produce condensation, which affects the analysis of the instrument on the syngas components, the tracing heat of the sampling device is required to be controlled at 230 degrees centigrade, the first pneumatic valve 13 and the second pneumatic valve 14 respectively control the opening and closing of the first sampling device 11 and the second sampling device 12, the first mass flowmeter 15 is used to measure the total syngas mass without dehydration after sampling, then the constant temperature condensing device 16 dehydrates the wet syngas, the second mass flowmeter 17 measures the syngas mass after dehydration, the water proportion is calculated by comparing the masses before and after condensation, the main pipe is connected with the carbon monoxide detector 18 after removing water in the wet syngas, and the alarm is given and the first valve is closed to realize safety protection when the concentration detected by the carbon monoxide detector 18 in the infrared instrument cabinet is higher than 200 ppm. The first pressure regulating valve 19 of the bypass pipe is set to 1.5 Bar, the first flow regulating valve 110 controls the flow at 260 ml/h, the first solenoid valve 111 and the second solenoid valve 112 respectively control the two ways of syngas to enter into the two instruments, and the instrument switching and calibration can be controlled by the two solenoid valves. The second flow regulating valve 113 and the third flow regulating valve 114 are connected to the same instrument, and the second flow regulating valve 113 and the third flow regulating valve 114 control the flow greater than 60 ml/h. The fourth flow regulating valve 115 and the fifth flow regulating valve 116 operate in the similar way, the pipe instrument fails when the flow of any flow regulating valve is lower than 60 ml/h, the system reports a pipe fault and outputs the value of another pipe.

In a preferred embodiment, Wobbe analysis instrument is used to analyze the proportion of components of the fuel gas to calculate the calorific value of syngas. Wobbe analysis instrument has two sampling devices, two Wobbe analysis instruments are arranged and can measure simultaneously, the measurement error system will give an alarm if the component values measured by the two instruments are relative, and these devices can improve the measured data reliability of the analysis instrument. Wobbe analysis instrument can directly measure the components of dry syngas and calculate the calorific value Q, the calorific value Q1 (also known as the measured value) of the wet syngas can be calculated through the water proportion measured by the instrument, and the calorific value Q2 (also known as the calculated value) of the wet syngas can be calculated by calculating the water proportion by the total syngas volume and the total injected steam volume. Three calorific value formulas are as follows:

Calorific value of dry syngas:

$$Q = V_{C0}\ \% \times 12.64 + V_{H2}\ \% \times 18.79 + V_{CH4}\ \% \times 35.88$$

Q: Calorific value of dry syngas (MJ/Nm3);
$V_{co}$ %: CO volume ratio measure by the instrument;
$V_{H2}$ %: H$_2$ volume ratio measure by the instrument;
$V_{CH4}$ %: CH$_4$ volume ratio measure by the instrument;
Measured calorific value of wet syngas:

$$M1_{H2O}\ \% = \left( \frac{MQ1 - MQ2}{MQ1} \right)$$

5

$M1_{H2O}\%$: Water mass percentage measured by Wobbe instrument;

MQ1: Mass of wet syngas measured by the instrument;

MQ2: Mass of dry syngas measured by the instrument;

$$M1_{CO}\ \% = \left( \frac{V_{CO}\ \%\times 28}{\begin{matrix}V_{CO}\ \%\times 28 + V_{H2}\ \%\times 2 + \\ V_{CH4}\ \%\times 16 + V_{N2}\ \%\times 28 + V_{CO2}\ \%\times 44\end{matrix}} \right) \times$$

$$\left( 1 - \frac{MQ1 - MQ2}{MQ1} \right)$$

$M1_{CO}$ %: CO mass ratio in wet syngas measured by the instrument;

Similarly, the mass percentages of $M1_{H2}\%$, $M1_{CH4}\%$, $M1_{N2}\%$ and $M1_{CO2}\%$ can be calculated:

$$V1_{CO}\ \% = \left( \frac{M_{CO}\ \%/28}{\begin{matrix}M1_{CO}\ \%/28 + M1_{H2}\ \%/2 + \\ M1_{CH4}\ \%/16 + M1_{N2}\ \%/28 + M1_{CO2}\ \%/44\end{matrix}} \right)$$

$V1_{CO}$ %: CO volume ratio in wet syngas measured by the instrument;

Similarly, the volume percentages of V1H2%, V1CH4%, V1N2% and V1CO2% in the wet syngas measured by the instrument can be calculated:

$$Q1 = V1_{CO}\ \%\times 12.64 + V2_{H2}\ \%\times 18.79 + V3_{CH4}\ \%\times 35.88$$

Q1: Calorific value of wet syngas calculated by the instrument;

Calculated calorific value of wet syngas:

$$M2_{H2O}\ \% = \left( \frac{QF1}{QF1 + QF2} \right)$$

QF1: Flow of injected steam;

QF2: Flow of dry syngas;

$$M2_{CO}\ \% = \left( \frac{V_{CO}\ \%\times 28}{\begin{matrix}V_{CO}\ \%\times 28 + V_{H2}\ \%\times 2 + \\ V_{CH4}\ \%\times 16 + V_{N2}\ \%\times 28 + V_{CO2}\ \%\times 44\end{matrix}} \right) \times$$

$$\left( 1 - \frac{QF1}{QF1 + QF2} \right)$$

Similarly, the mass percentages of $M2_{H2}\%$, $M2_{CH4}\%$, $M2_{N2}\%$ and $M2_{CO2}\%$ can be calculated:

$$V2_{CO}\ \% = \left( \frac{M_{CO}\ \%/28}{\begin{matrix}M2_{CO}\ \%/28 + M1_{H2}\ \%/2 + \\ M2_{CH4}\ \%/16 + M2_{N2}\ \%/28 + M2_{CO2}\ \%/44\end{matrix}} \right)$$

6

Similarly, the volume percentages of $V2_{H2}\%$, $V2_{CH4}\%$, $V2_{N2}\%$ and $V2_{CO2}\%$ in the wet syngas measured by the instrument can be calculated:

$$Q2 = V2_{CO}\ \%\times 12.64 + V2_{H2}\ \%\times 18.79 + V2_{CH4}\ \%\times 35.88$$

For the measured and calculated calorific values, the proportions of dry syngas components are the same, and the difference lies in water contents in the two calculations. The two calorific values not only improve the monitoring reliability of calorific value and but also monitor whether water is accumulated inside the pipe and whether the instrument operates normally by comparing the values. During normal operation, the difference between the measured calorific value and the calculated calorific value is generally controlled to 1%-4%. When the deviation is more than 5%, it is necessary to consider the problems of abnormal measuring equipment and abnormal process state, which will lead to the failure of the whole calorific value control and seriously lead to unstable combustion and high hum, resulting in overtemperature shutdown of the turbine section or exhaust section. The measured calorific value and the calculated calorific value are two very important parameters, which can indirectly monitor whether the injected steam flow is normal in the process and whether the constant temperature device in the analysis instrument normal dehydrates. When the constant temperature dehydration effect is poor in the analysis instrument, water will enter the analysis instrument and affect the measurement. Therefore, the measured calorific value and the calculated calorific value are the parameters of IGCC process.

In a preferred embodiment, a main pipe is connected with a carbon monoxide detector after syngas pretreatment, and an alarm is given when the concentration of carbon monoxide is higher than 200 ppm in the analysis instrument cabinet.

In a preferred embodiment, standard methane, carbon dioxide, carbon monoxide, hydrogen cylinders and zero nitrogen cylinders are provided, and the instrument range and zero point can be calibrated.

In the description of the specification, the terms such as "connected", "installed" and "fixed" should be understood in broad sense. For example, "connected" may be fixedly connected, or detachably connected or integrally connected; "connected" may be directly connected or indirectly connected through an intermediary. The ordinary technician in the field may understand the specific meanings of the above terms in the application as the case may be.

In the description of the specification, the description of the terms such as "one embodiment" and "some embodiments" means that the specific characteristics, structures, materials or features described in combination with such embodiments or examples are included in at least one embodiment or example of the application. In the specification, the schematic representations of the terms above do not necessarily refer to identical embodiments or examples. Furthermore, the specific characteristics, structures, materials or features described may be combined in an appropriate manner in any one or more embodiments or examples.

The above are preferred embodiments of the application only and are not intended to restrict the application, which is subject to various changes and variations for technicians in the field. Any modification, equivalent substitution and improvement made within the spirit and principles of the application should be included in the scope of protection of the application.

The invention claimed is:

1. An IGCC (Integrated Gasification Combined Cycle) fuel component analysis and calorific value measurement system, characterized by including the following steps: Step 1: Syngas sampling: Sample syngas in two ways, reduce the syngas pressure, and heat and regulate the syngas; Step 2: Syngas pretreatment: Dehydrate the wet syngas through the constant temperature condensing unit to remove water in the wet syngas, and calculate the water proportion by comparing the mass before and after condensation; Step 3: Syngas component measurement: A syngas component measuring device comprises a first measuring device and a second measuring device, each measuring device is composed of a methane, carbon dioxide and carbon monoxide measuring instrument and a hydrogen measuring instrument; Step 4: Calorific value calculation of syngas: The infrared instrument measures the fuel component values, introduces the measured and calculated calorific value formulas, and compare the two calorific values as the reference of system calorific values; Step 5: Transmit the calculation results to a second calorific value analysis unit through a first calorific value analysis unit, and the second calorific value analysis unit performs PID (Proportional Integral Derivative) mediation by comparing the preset calorific value with the received calorific value to control the regulating valve to regulate the total calorific value of the fuel; Step 6: The chromatographic instrument is connected with the second calorific value analysis unit as a standby instrument, and the value of the chromatographic instrument can be selected to ensure complete loop control when the infrared instrument fails.

2. The IGCC (Integrated Gasification Combined Cycle) fuel component analysis and calorific value measurement system according to claim 1, characterized in that a main pipe is connected with a carbon monoxide detector after syngas pretreatment, and an alarm is given when the concentration of carbon monoxide is higher than 200 ppm in the analysis instrument cabinet.

3. The IGCC (Integrated Gasification Combined Cycle) fuel component analysis and calorific value measurement system according to claim 2, characterized in that standard methane, carbon dioxide, carbon monoxide, hydrogen cylinders and zero nitrogen cylinders are provided, and the instrument range and zero point can be calibrated.

4. The IGCC (Integrated Gasification Combined Cycle) fuel component analysis and calorific value measurement system according to claim 3, characterized in that the measured and calculated calorific value formulas are used to analyze the equipment status and the fuel calorific value through two pairs of calorific values.

* * * * *